United States Patent [19]

Derner et al.

[11] 4,019,295
[45] Apr. 26, 1977

[54] LIGHT TRANSMITTING PANEL WITH SOUND DAMPING PROPERTIES

[75] Inventors: Paul Derner, Gelsenkirchen; Hans Sonntag, Gelsenkirchen-Buer; Otto Stehl, Essen, all of Germany

[73] Assignee: BFG Glassgroup, Paris, France

[22] Filed: Sept. 16, 1975

[21] Appl. No.: 613,853

[30] Foreign Application Priority Data

| Apr. 4, 1975 | Luxembourg | 72200 |
|---|---|---|
| Sept. 16, 1974 | Luxembourg | 70915 |
| Sept. 16, 1974 | Luxembourg | 70916 |
| Dec. 27, 1974 | Germany | 2461533 |
| Dec. 27, 1974 | Germany | 2461531 |
| Dec. 27, 1974 | Germany | 2461532 |
| Feb. 1, 1975 | Germany | 2504293 |

[52] U.S. Cl. .................... 52/171; 52/172; 52/616; 156/107; 181/33 G; 428/34
[51] Int. Cl.² ................ E06B 5/20; B32B 1/04
[58] Field of Search ............ 52/171, 172, 304, 398, 52/406, 616; 428/34, 38; 156/99, 107; 181/33 G

[56] References Cited

UNITED STATES PATENTS

| 2,011,557 | 8/1935 | Anderegg | 428/34 |
|---|---|---|---|
| 2,817,124 | 12/1957 | Dybrig | 52/406 |
| 2,885,746 | 5/1959 | Gura | 52/172 |
| 3,596,622 | 8/1971 | Moore | 52/2 |
| 3,775,914 | 12/1973 | Patil | 52/616 X |
| 3,783,084 | 1/1974 | Quenett | 52/616 X |
| 3,846,152 | 11/1974 | Franz | 52/616 |
| 3,875,706 | 4/1975 | Okawa | 52/616 |
| 3,897,580 | 7/1975 | Ingenansson | 428/34 |

*Primary Examiner*—Alfred C. Perham
*Attorney, Agent, or Firm*—Spencer & Kaye

[57] ABSTRACT

A light transmitting panel composed of at least two panes held in spaced relation by a spacer assembly to define at least one space between panes is given improved sound damping properties by giving such space a thickness of greater than 9mm, by causing the space between panes to be sealed from the external atmosphere, and by filling this space with a gaseous medium composed of air and at least one other gas, the air constituting at least 30%, by volume, of the medium, and whose composition is such that the velocity of sound propagation therethrough differs by at least 5% from that in dry air at the same pressure and temperature as the medium.

38 Claims, 11 Drawing Figures

LIGHT TRANSMITTING PANEL WITH SOUND DAMPING PROPERTIES

BACKGROUND OF THE INVENTION

The present invention relates to a light transmitting panel of the type composed of at least two panes held in spaced relation by one or more spacer members to define at least one inter-pane space. The invention also relates to a method of manufacturing such a panel. The invention relates particularly to the acoustic properties of such panels, and in addition to the thermal properties thereof.

The use of large areas of windows and other panels such as glazed partitions which are a feature of modern architectural practice, complicates the problem of achieving comfortable sound levels in rooms in whose walls the panels are installed especially in noisy environments. The problem is particularly acute in the case of windows facing busy roads or near airports, and light transmitting panels having good acoustic insulation properties are required for use in these cases. Such properties are also required for panels which are to form interior partitions such as in sound recording and broadcasting studios.

Light transmitting panels composed of two or more sheets of glass or plastic material held in spaced relation by one or more spacer members, such as have been made for use as windows with the object of reducing heat loss from a building, also give rise to a loss in sound transmission, but this sound transmission loss, is, in general, insufficient for many purposes.

This sound transmission loss can be increased by increasing the width of the or each inter-sheet space, but this gives rise to manufacturing difficulties and increases the cost of the panel; it also involves the use of a larger and therefore heavier and more expensive frame for holding the panel in position.

It has also been proposed to increase the masses of the sheets of the panel in order to improve its acoustic properties.

When plotting a graph of sound transmission loss through a given panel against various frequencies of incident audible sound, it is found that this is not a straight line and that there are various regions where transmisson peaks occurs.

One such transmission peak occurs at fairly high audible frequencies and is due to the so-called coincidence effect. The frequency of sound waves giving rise to the coincidence effect at a given sheet depends upon the angle of incidence of such waves on the sheet, and corresponds to the frequency at which the projected incident wavelength on the sheet is equal to the wavelength of free bending waves in the sheet. Thus the lowest sound frequency at which coincidence takes place, the critical frequency, is that which corresponds to a sound wavelength equal to the free bending wavelength. The free bending wavelength of a sheet, according to currently accepted theories, decreases with increasing thickness, or mass per unit light transmitting surface area.

Another such transmission peak occurs at a fundamental resonance frequency of the panel, and this also depends inter alia on the masses of the sheets. For a single sheet of a given area, it has been calculated that the resonance frequency increases with the mass of the sheet. In a multi-sheet panel, the sheet spacing also has an effect on the resonance frequency.

In the median range of audible frequencies, that is between the coincidence and resonance tramission peaks, the sound transmission loss increases with increase in the total mass of the sheets.

Thus it will be seen that in general, although there is an increase in sound transmission loss over this median fequency range when the thicknesses of the sheets are increased, the extent of this frequency range is reduced, and as a consequence of this it is in practice extremely difficult to construct a multiple glazing panel across which the mean sound transmission loss exceeds a given value. By way of example, the sound transmission loss through a known double glazing unit will not in general exceed 35 dB.

SUMMARY OF THE INVENTION

It is an object of the present invention to improve the acoustic properties of light transmitting panels of the type composed of at least two panes held in spaced relation by one or more spacer members.

This and other objects according to the present invention are achieved, in a light transmitting panel compsed of at least two panes held in spaced relation by one or more spacer members to define at least one inter-pane space, by giving at least one inter-pane space a thickness of more than 9mm and sealing it off from the external atmosphere and by providing a gaseous medium which fills that space, the medium including at least 30% by volume of a gas having the composition of air with an additional amount of at least one other gas, the total composition of the medium being such that the velocity of sound propagation in the gaseous medium differs from that in dry air at the same pressure and temperature by at least 5%.

Each such pane may be a single sheet of material or a laminate, that is, an assembly of two or more sheets bonded together. Each such sheet may be a plastic sheet, or it may be of vitreous material. The expression "vitreous material" is used herein to denote glass or vitrocrystalline material, which latter is a material which can be made by subjecting a glass to a heat treatment to induce the formation of one or more crystalline phases therein.

It has been found that the present invention makes possible the construction of light transmitting panels which have improved acoustic properties especially over low and median frequency ranges, and which are fairly simple and therefore inexpensive to manufacture because of the proportion of air remaining in an inter-pane space. This advantage is particularly apparent if the various panes of the panel are assembled in the atmosphere. Only partial replacement of air initially trapped within an inter-pane space is required, and this will clearly be less time consuming and less expensive than total replacement.

The improvement in sound transmission loss afforded by a panel according to the present invention lies primarily in the range of median sound frequencies, that is to say between the resonance frequency and the critical frequency of coincidence. Above the critical frequency of coincidence, the sound transmission loss through a panel according to the invention may not be appreciably different from that through a similarly dimensioned air-filled panel. Since this critical frequency is often in practice close to the limit of the sound frequency range to be considered in building practice, this is not considered important.

Furthermore, it is in general found that the frequency at which a resonance transmission peak occurs in a panel according to the invention is lower than the corresponding frequency for a similarly dimensioned air-filled panel.

Preferably the gaseous medium is or is equivalent in composition to a mixture comprising at least 50% by volume of air. Gas mixture equivalent in composition to air means a man-made mixture having essentially the same composition as air, or the same composition as the principal elements of air.

The use of such a high percentage of air further facilitates manufacture of a light transmitting panel according to the invention. Furthermore, the incorporation of a proportion of air in an inter-pane space can have a very beneficial effect on the acoustic properties of the panel. In many cases it is found that for a given panel there is greater sound transmission loss when an inter-pane space is filled with a gaseous medium composed of a mixture of a relatively dense gas such as sulphur hexafluoride and air than when such space is filled with the relatively dense gas alone. In fact it has been found that said gaseous medium can advantageously include as much as 95% air, by volume, in certain panels.

Preferably, the velocity of sound propagation in the gaseous medium is between 40% and 95% of the velocity of sound propagation in dry air at the same pressure and temperature, and optimally the velocity of sound propagation in the gaseous medium is at least 60% of the velocity of sound propagation in dry air at the same pressure and temperature. It has been found that the use of gaseous media having these properties gives particularly good results in terms of sound transmission loss through a panel according to the invention.

The use of such gaseous media generally simplifies overall fabrication of the panels since such media will normally include fairly dense gases which will not readily diffuse out of a sealed inter-pane space. Therefore, it will not be necessary to take stringent precautions in order to ensure the integrity and effectiveness of the panel over a given period of time.

Another advantage of adopting this feature is that such gaseous media, as a general rule, confer improved thermal insulation properties on a panel and this therefore enables a panel to be constructed which is extremely effective as both acoustic and thermal insulation.

However, it is to be noted that in addition to the displacement of the resonance transmission peak frequency towards a lower value, the adoption of this feature may have the effect of augmenting the resonance transmission peak, that is the sound transmission loss is reduced at resonance frequencies. This is in most cases of little practical importance, since these frequencies are reduced to a range to which most listeners are comparitively insensitive and the degree of augmentation of the resonance peak is in general lower for gaseous media which contain higher proportions of air Advantageously, the gaseous medium is in part made up of sulphur hexafluoride ($SF_6$), since this gas has been found particularly suitable for use in a panel according to the invention.

Other eminently suitable gaseous media for use in a panel according to the invention contain at least one gas chosen from among dichlordifluoromethane (Freon) ($CCl_2F_2$), carbon dioxide ($CO_2$), argon (Ar), butane ($C_4H_{10}$), nitrous oxide ($N_2O$), and chloropentafluoroethane ($C_2ClF_5$). These gases may be used individually or in combination with one another or with other gases to form art of a gaseous medium in which there is at least 30%, by volume, of air.

Many other gases can also be used, in particular gases which are denser than air and contain carbon, sulphur or nitrogen in compound form.

Preferably, the panel includes a pane whose mass per unit light transmitting surface area is at least 1.2 times as great as the mass per unit light transmitting surface area of the or another pane of the panel, and optimally, the panel includes a pane whose mass per unit area is at least 1.2 times as great as the mass per unit area of the or each other pane of the panel. The light transmitting surface area of a pane is the area of one major face thereof and will be referred to hereafter simply as the area.

The adoption of either of these features leads to a very important advantage. As has been explained, the critical frequency of coincidence of a sheet of a given area decreases for an increased mass per unit area, and by ensuring that the panes of a panel according to the invention have, respectively, at least two different masses per unit area in this way, the panes are given different critical frequencies of coincidence so that the coincidence sound transmission peak of one pane falls at a different frequency from that of the or another pane, and this gives an improved sound transmission loss in the upper range of audible frequencies. An improvement is also apparent over the median range of sound frequencies.

Furthermore, it has been found that the utilization of different pane masses operates in synergism with the use of a gaseous medium of the type specified above, in that the sound transmission loss due to the combination of these features is greater than the sum of the increases in sound transmission loss due to the features taken individually.

In a particular example, double glazing units of a given area and having an inter-pane space of 12mm and a total glass thickness of 12mm can be compared with one another. The sound transmission loss may be characterized by a single value $R_{ir}$ obtained according to German VDI 2719.

For a panel in which the panes have the same thickness, 6mm each, and the space between them is filled with air it is found that $R_{ir} = 33$ dB. By changing the masses of the panes so that they are 8mm and 4mm thick, respectively, and still filling the inter-pane space with air, $R_{ir}$ can be increased to 35 dB. By filling the inter-pane space with a gaseous medium composed of at least 30% by volume of air with an additional amount of at least one other gas, the velocity of sound propagation in such medium differing from that in air by more than 5%, but using panes each 6mm thick, it is also possible to increase $R_{ir}$ to 35 dB. Thus either of these features gives an increase in sound transmission loss of 2 dB.

By combining these features; and filling the space between two panes 8mm and 4mm thick with the same gaseous medium, it is found that $R_{ir}$ is not 37 dB, as might be expected, but is increased even further to 41 dB, an increase of 8 dB over a symmetrical air-filled panel of the same total glass mass.

The difference between the expected sound transmission loss, e.g. 37 dB, and the actual sound transmission loss, e.g. 41 dB, due to this synergistic effect is greater for double glazing panes in which the mass ratio of the panes is high, and for the same mass ratio the synergistic effect is greater when the total mass of the panes is small.

For practical reasons it is desirable to limit the difference in thickness of the various panes of the panel according to the invention, and accordingly it is preferred that the heavier or heaviest pane have a mass per unit area at most equal to three times the mass per unit area of the lighter or lightest pane. This facilitates manufacture of the unit. Considering in particular a double unit, it is usually desirable to have one pane no less than say 3mm or 4mm thick, as it is otherwise apt to be easily broken, and accordingly the adoption of a higher pane mass ratio would mean that the other pane would be required to be unduly thick.

The invention has so far been described with reference to preferred embodiments using gaseous media in which the velocity of sound propagation is lower that it is in air.

In other highly advantageous embodiments, use is made of a gaseous medium in which the velocity of sound propagation is higher than it is in air.

Preferably, such gaseous medium is in part composed of at least one gas selected from among helium ($H_2$), neon (Ne), methane ($CH_4$) and hydrogen ($H_2$). Such gases may be used individually or mixed with each other or with other gases, and when used in a gas/air mixture they have been found to give good results in panels according to the invention. Other gases may also be used and preference is given to mono-and di-atomic gases. Hydrogen in particular can give good acoustic results.

Preferably, the gaseous medium used is such that the velocity of sound propagation therein is at least 1.20 times that in dry air at the same pressure and temperature. The use of such media also affords an improved sound transmission loss over the median sound frequency range and also displaces the resonance transmission peak to a lower frequency. Furthermore, sound transmission at such peak is reduced.

Generally speaking it is found that best results from the acoustic point of view are achieved when using such gases in fairly high, and sometimes even major, proportions by volume in a gas/air mixture. It should be noted that in general for these gases, the lower the proportion of air in the gaseous medium, the worse becomes the thermal insulation afforded by a panel. This, however, is often unimportant, particularly when the panel is to be used as an interior partition.

Preferably, the panel includes a pane whose mass per unit area is at least 1.2 times as great as the mass per unit area of the or an other pane of the panel; advantageously the panel includes a pane whose mass per unit area is at least 1.2 times as great as the mass per unit area of the or each other pane of the panel. In certain preferred panels the panes thereof have at least two different masses per unit area and the heavier or heaviest pane has a mass per unit area at most equal to three times the mass per unit area of the lighter or lightest pane. The adoption of these features affords similar advantages to those discussed above in relation to corresponding features of panels in which the or one inter-pane space is filled with a gaseous medium in which the velocity of sound propagation is lower than in air. It is to be noted that the extent of the synergistic effect referred to is greater for gaseous media in which the velocity of sound propagation is lower than in air than it is for media in which such velocity is higher.

Particular importance is given to embodiments of the invention in which the panel is composed of at least three panes defining, with one or more spacer members, at least two sealed inter-pane spaces, and in which such spaces contain gaseous media producing respectively different velocities of sound propagation. For example, one such space could contain air. Preferably, however, one such space contains a gaseous medium in which the velocity of sound propagation is lower than in dry air at a given pressure and temperature and the or an other such space contains a gaseous medium in which the velocity of sound propagation is higher than in dry air at the given pressure and temperature. In this way it is possible to achieve the advantage of reduction of a resonance transmission peak due to the use of a gaseous medium in which the velocity of sound propagation is higher than in air combined with the advantage of increased thermal insulation due to the use of a gaseous medium in which the velocity of sound propagation is lower than in air.

Particular importance is also attached to embodiments of the invention in which the panel is composed of least three panes defining, with one or more spacer members, at least two inter-pane spaces which are sealed from the atmosphere and are of respectively different thicknesses. Embodiments of the invention having this feature have the advantage of being particularly effective at the lower end of the audible frequency range.

The inner-pane spaces, may, for example, be inter-communicating, in which case they would of course be filled with the same gaseous medium, and this would have the effect of eliminating the possibility of the intermediate pane bending due to pressure differences between the two inter-pane spaces. It is also possible that this may increase the transmission loss over the resonance frequency range.

It has been found that, for example, a triple glazing panel will tend to resonate at frequencies which are governed by the thicknesses of such spaces and of course the masses of the various panes. By ensuring that these spaces have different thicknesses it is possible to confer two basic resonance frequencies on the panel and this gives an improved mean sound transmission loss in the resonance region over the case where the spaces are of the same thickness and the panel resonates as a whole.

Preferably, the thinner of such spaces contains a gaseous medium in which the velocity of sound propagation is lower than in dry air at the given pressure and temperature and the thicker of such spaces contains a gaseous medium in which the velocity of sound propagation is higher than in dry air at the given pressure and temperature. This increases the beneficial effect on sound transmission loss in the resonance frequency range, and also gives some improvement to the thermal properties of the panel. As has been stated above, gaseous media in which the velocity of sound propagation is lower than in air are beneficial from the point of view of thermal insulation, and this advantage is enhanced if such media are contained in a narrow space in which a steady flow pattern of convection currents cannot easily be established.

Advantageously, the thicker or thickest inter-pane space is at least twice as thick as the or another such space, since this enhances the beneficial effect on sound transmission loss.

In preferred embodiments of the invention at least one pane of the panel is a laminate. Although this admittedly adds considerably to the cost of a panel, in certain circumstances this disadvantage is completely outweighed by the increase in sound transmission loss afforded over a very wide range of audible frequencies.

Advantageously, at least one pane face which defines a boundary of an inter-pane space bears a metal or oxide coating. Such coating may be an infrared reflecting coating, e.g. of a metal or metal oxide, which will increase the thermal insulation afforded by the panel, or it may be an anti-reflective coating, e.g. of silicon dioxide, to increase the light transmitting power of the panel. This latter may be particularly important in the case of triple pane panels, or those having even more panes, since it is quite usual for there to be a light transmission loss of 4% at each gas/glass interface. In the case of a triple panel this would lead to a total light transmission loss of 24%. Such a light transmission loss can be reduced by the use of anti-reflective coatings.

Such metal and oxide coatings have also the effect of modifying friction between the gaseous mass in an inter-pane space and the coated pane, and this is found to modify the mechanical coupling between such gaseous mass and sheet which in turn gives a modification to the sound transmission loss.

In order to avoid condensation within a multiple pane panel it is desirable that the gas mixture contained thereby should be dry, but it has been found that many gases whose use is envisaged by the present invention tend to interact with conventional desiccating agents such as silica gel. Preferably, the or at least one such inter-pane space is, according to the present invention, placed in communication with a desiccant selected from: calcium sulphate ($CaSO_4$); calcium chloride ($CaCl_2$); calcium hydride ($CaH_2$); diphosphorus pentoxide ($P_2O_5$) and molecular sieves with pores smaller or equal to 4 A. The preferred range of desiccants does not suffer from the disadvantage mentioned above with regard to silica gel.

It is desirable, when practicing the present invention, to ensure that the gaseous medium is chemically stable; in particular it is desirable to avoid the use of combustible and especially explosive gas mixtures. It is also desirable to avoid the use of highly toxic gaseous media.

The pressure of the gaseous medium in an inter-pane space may conveniently be equal to the atmospheric pressure at the site of manufacture of the panel, since this will clearly simplify panel production, but such pressure may with advantage be varied especially if the panel is destined for installation at a higher or lower altitude so that the pressure of the gaseous medium can be made equal to the nominal atmospheric pressure at that altitude. However the invention also includes cases in which the pressure of the gaseous medium is quite different from atmospheric pressure and, in particular, cases in which an inter-pane space is filled with a gaseous medium at a low pressure.

It has been found that many of the physical parameters of a panel according to the invention are interdependent. For example, especially when the gaseous medium used is one in which the velocity of sound propagation is lower than it is in air, it has been found desirable that, as the total mass of the panes of a panel of a given area is increased, the ratio between the masses of individual panes should also be increased. The dimensions of a panel also affect the optimum choice of gaseous medium, particularly when the medium is one in which the velocity of sound propagation is lower than in air. In general, it is found that for best results, the greater the mass ratio of panes bounding an inter-pane space, the higher should be the volume proportion of air in the mixture in that space. As such panel increases in width and/or area it is also believed that the optimum volume proportion of air increases. It is also believed that, in a give panel, the optimum volume proportion of air depends on the gas or gases with which it is mixed and should increase with increase in density of the other gas(es).

Reference has been made to an optimum volume proportion of air. The reason for there being such an optimum in a gaseous medium in which the velocity of sound propagation is lower than it is in air is believed to be as follows. As a dense gas is introduced into an air-filled inter-pane space of a given panel, the resonance transmission peak is accentuated but at the same time the resonance peak frequency is shifted to a lower value, and there is an improved sound transmission loss over the median sound frequency range, i.e. the range of frequencies between the resonance and coincidence frequencies of the panel. However, the improvement in sound transmission loss over the median frequencies does not proceed at the same rate as the deterioration at the changing resonance frequency, and there comes a time when further increasing the volume of dense gas in the gas/air mixture no longer gives a net improvement in sound transmission loss over the whole audible frequency range.

It is presently believed that there is likewise an optimum value for the proportions of the constituents in a gas/air mixture in which the velocity of sound propagation is higher than in air, but the reasons for this are not clearly understood.

A panel according to the invention may be merely translucent, but is preferably transparent.

A spacer member of a panel according to the invention may be sealed to a pane e.g. a vitreous pane by soldering, or it may be glued. Certain adhesive materials can form additional sound damping means between a spacer member and such a pane.

Preferably each pane of a panel according to the invention is a vitreous pane.

The present invention also provides a method of manufacturing a light-transmitting panel composed of at least two panes held in spaced relation by one or more spacer members to define at least one inter-pane space which method includes the steps of bringing at least two panes into face-to-face relation at a mutual spacing of at least 9mm and sealing such panes to one or more spacer members arranged to maintain such spacing, and filling the inter-pane space with a gaseous medium including at least 30% by volume of air with an additional amount of at least one other gas selected so that the velocity of sound propagation in the gaseous medium which ultimately fills the inter-pane space differs from the velocity of sound propagation in dry air at the same pressure and temperature by at least 5%. This is a very simple, convenient and economical method of manufacturing a light-transmitting panel having good acoustic insulating properties.

A method according to the invention preferably incorporates one or more of the following optional features: the gaseous medium includes at least 50% by volume of dry air; the at least one other gas is selected so that the velocity of sound propagation in said gaseous medium is between 40% and 95% of that in dry air at the same pressure and temperature; the panes are selected so as to have at least two different masses; the at least one other gas is or contains sulphur hexafluoride ($SF_6$); and the or at least one inter-pane space is in communication with a desiccant which is selected from: calcium sulphate ($CaSO_4$); calcium chloride ($CaCl_2$); calcium hydride ($CaH_2$); disphosphorous pentoxide ($P_2O_5$); and a molecular sieve with pores smaller or equal to 4 A.

The advantages of these preferred features will readily be inferred from the advantages described above with respect to corresponding preferred features of the panel.

DESCRIPTION OF THE PREFERRED EMBODIMENTS

The invention will be described by reference to a number of specific operative Examples of embodiments which have been reduced to practice. In the Examples, various test results are given, and these are based on tests which were all performed on panels measuring 1.5m by 2m. In some cases two values are given for the sound transmission loss through a particular panel. These values are $R_w$ obtained according to the German Standard VDI 2719 and $I_a$ measured according to the International Standard ISO/R717. The tests were in all cases, unless otherwise stated, carried out with the sound incident on the thicker or thickest pane of the panel as indicated by the arrows shown in the Figures. Where proportions of gases in gas mixtures are given, these are in all cases proportions by volume. The values of K, coefficient of thermal transmission are given in KCal per $m^2$ per hr. per °C temperature differential.

Figure 1

Figure 1:
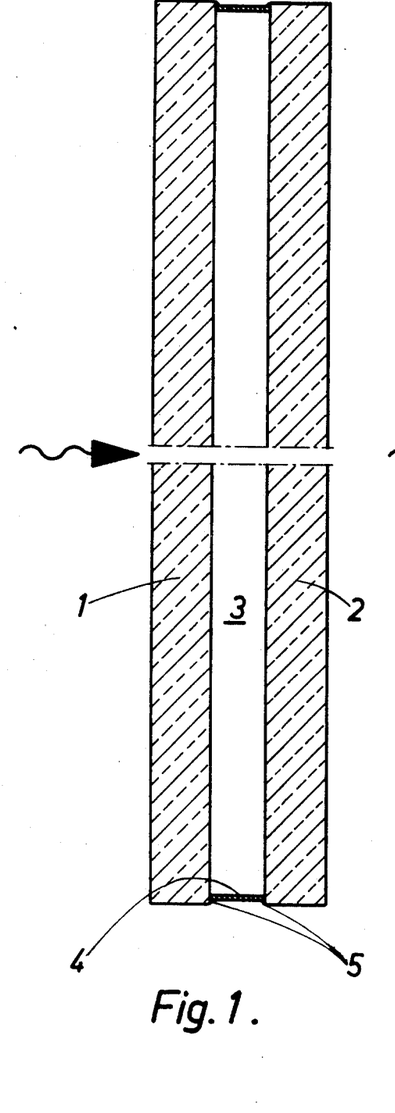
FIGS. 1 and 2 are cross-sectional views of two embodiments of double glazing panels according to the invention.

FIG. 1 shows a double glazing unit composed of first and second panes 1 and 2 both of the same thickness and each constituted by a single sheet of glass. The panes are spaced apart and the space 3 between them is sealed by a spacer strip 4 attached to metallized marginal portions of the glass sheets by solder beads 5.

Test Panel 1

For comparison purposes an air-filled test panel was produced to have the form shown in FIG. 1, composed of two panes of glass each 6mm thick spaced apart by a soldered spacer strip to define an inter-pane space 12mm thick.

The sound transmission loss was found to be $R_w = 33$ dB.

EXAMPLE 1

Test Panel 1 was flushed with sulfur hexafluoride ($SF_6$) until the inter-pane space contained a gaseous medium consisting of 25% $SF_6$ and 75% air. The velocity of sound propagation in this gaseous medium (Cg) is 78% of the velocity of sound propagation in air (Ca).

The sound transmission loss was found to be $R_w = 35$ dB, an improvement of 2 dB over Test Panel 1.

Test Panel 2

Another air-filled panel was produced to have the form shown in FIG. 1. Each pane of glass was 4mm thick, and the inter-pane space was 12mm thick. The sound transmission loss was found to be $R_w = I_a = 31$ dB.

EXAMPLE 2

Test Panel 2 was flushed with Freon ($CCl_2F_2$) until the inter-pane space contained 20% $CCl_2F_2$ and 80% air. For this gaseous medium, Cg = 78% Ca. The sound transmission loss afforded by this panel was found to be $R_w = I_a = 34$ dB, an improvement of 3 dB over the corresponding air-filled Test Panel 2.

FIG. 2

Figure 2:
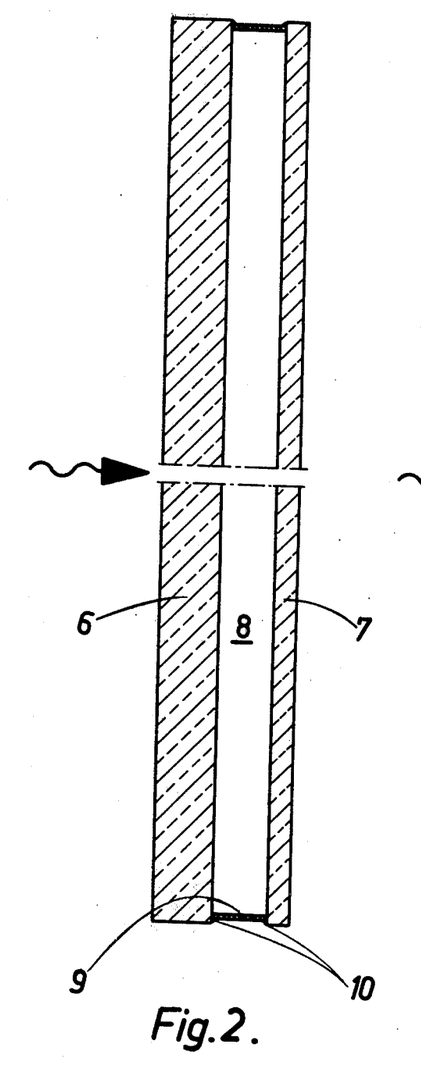

FIG. 2 shows a double glazing unit composed of first and second panes 6 and 7 each constituted by a single sheet of glass. The first pane 6 is thicker than the second pane 7. The panes are spaced apart and the space 8 between them is sealed by a spacer strip 9 attached to metallize marginal portions of the glass sheets by solder beads 10.

Test Panel 3

An air-filled test panel was made to have the form shown in FIG. 2. The first and second panes were, respectively, 8mm and 4mm thick, giving a pane mass ratio of 2:1, but with the same total pane mass as Test Panel 1 and the panel of Example 1, and the inter-pane space was again 12mm. The panel had a coefficient of thermal transmission of K = 2.54. The resonance transmission peak occurred at a frequency of $f_R = 200$Hz and the sound transmission loss at that frequency was L = 22 dB. The sound transmission loss was found to be $R_w = I_a = 35$ dB.

EXAMPLE 3

The inter-pane space of Test Panel 3 was filled with the same gaseous medium as was used in Example 1, namely 25% $SF_6$ and 75% air.

The sound transmission loss was found to be $R_w = 41$ dB.

It will thus be seen that the adoption of either of the features which distinguish the panel of Example 1 and Test Panel 3 from Test Panel 1 gives an improvement in the sound transmission loss $R_w$ of 2 dB, but that by combining these features and constructing the panel of Example 3, there is an improvement in sound transmission loss $R_w$ over Test Panel 1 not of 4 dB as might be expected, but of 8 dB. This is due to the fact that the two features act in synergism.

Test Panel 4

A panel was constructed to have the form shown in FIG. 2 and with the same dimensions as Test Panel 3. The inter-pane space was filled with Freon ($CCl_2F_2$). The velocity of sound propagation in this gas (Cg) is 44% of the velocity of sound propagation in air (Ca). The following test results were obtained:

$R_w$ = 40 dB
$f_R$ = 160Hz
K = 2.37
$I_a$ = 39 dB
L = 19 dB

EXAMPLE 4

The air in Test Panel 3 was replaced with a mixture of 50% Freon ($CCl_2F_2$) and 50% air. The following results were obtained:

Cg = 59% Ca
$R_w$ = $I_a$ = 40 dB
$f_R$ =;0 160Hz
L = 21 dB
K = 2.33

These figures illustrate an improvement in thermal and acoustic insulation over Test Panel 3 and over Test Panel 4 and this shows that by including a proportion of air greater than 30% of the gaseous medium a more favorable effect on sound transmission loss, particularly in the resonance frequency range, can be achieved than by using a pure gas.

Test Panel 5

An air-filled double glazing panel was made to have the form shown in FIG. 2, in which the first and second panes were of glass 6mm and 4mm thick, respectively, giving a pane mass ratio of 1.5:1, and the inter-pane space was 12mm thick.

For this panel $R_w$ = $I_a$ = 33 dB.

Though K was not measured for this panel it would be greater than the corresponding value of 2.54 for Test Panel 3 in view of the smaller total glass thickness.

EXAMPLE 5

A panel was constructed to have the form shown in FIG. 2 and with the same dimensions as Test Panel 5. The inter-pane space 8 was filled with a gaseous medium consisting of 10% Freon ($CCl_2F_2$) and 90% air. The following results were observed:

Cg = 87% Ca
$R_w$ = $I_a$ 36 dB
$f_R$ = 200Hz
L = 18 dB
K = 2.51

It will be noted that this represents an improvement over Test Panel 5 and that there is even a slight improvement over the overall sound transmission loss and thermal insulation afforded by Test Panel 3, despite the greater thickness of glass and greater pane mass ratio of Test Panel 3.

Test Panel 6

An air-filled double glazing panel was to have the form illustrated in FIG. 2. The glass sheets were 8mm and 6mm thick, respectively, giving a pane mass ratio of 1.33:1 and a total pane thickness of 14mm. The inter-pane space was 12mm thick.

The sound transmission loss $R_w$ was found to be 35 dB.

EXAMPLE 6

Test Panel 6 then had its inter-pane space filled with 25% $SF_6$ and 75% air. For this gaseous medium, Cg = 78% Ca.

The sound transmission loss $R_w$ was found to be 38 dB.

Test Panel 7

An air-filled double glazing panel was made to have the form illustrated in FIG. 2. The glass sheets were 10mm and 4mm thick, respectively, giving a pane mass ratio of 2.5:1 and the same total pane thickness as Test Panel 6. The inter-pane space was again 12mm thick.

The sound transmission loss $R_w$ was found to be 36 dB.

EXAMPLE 7

Test Panel 7 then had its inter-pane space filled with 25% $SF_6$ and 75% air, the same gaseous medium as was used in

EXAMPLE 6

The sound transmission loss $R_w$ was found to be 41 dB.

Comparison of air-filled Test Panels 6 and 7 and Examples 6 and 7 shows two interesting features. By increasing the mass ratio of the panes but leaving the total pane mass unaltered, there is an improvement in the sound transmission loss $R_w$. Furthermore, it will be noted that the improvement in sound transmission loss between the panel of Example 7 and air-filled Test Panel 7 is more than that between the panel of Example 6 and air-filled Test Panel 6. This shows that for panels of the same total mass the synergistic effect referred to above is greater as the mass ratio of the panes of the panel increases.

Test Panel 8

An air-filled double glazing panel having the form illustrated in FIG. 2 was made from sheets of glass 12mm and 4mm thick, respectively, and separated by an inter-pane space of 12mm. The pane mass ratio was thus 3:1.

The following properties were observed:

$R_w$ = 36 dB
$f_R$ = 250 to 300Hz
L = 25 dB

Test Panel 9

A panel was constructed to have the form shown in FIG. 2 and with the same dimensions as Test Panel 8. The inter-pane space was filled with $CCl_2F_2$.

The following properties were observed:

Cg — 44% Ca
$R_w$ = 40 dB
$f_R$ = 160Hz
L = 14 dB

EXAMPLE 8

A panel was constructed to be identical with, and to have the same dimensions as, Test Panels 8 and 9. The inter-pane space was filled with 20% $CCl_2F_2$ and 80% air.

The following properties were observed:

Cg = 78% Ca
$R_w$ = 42 dB
$f_R$ = 160Hz

L = 23 dB

This Example and comparison with air-filled Test Panels 8 and 9 illustrates the important fact that a mixture of a particular gas and air can confer better acoustic properties on a panel of given dimensions than either the pure gas or pure air. It also points to the fact that the proportion of such gas can be comparatively small, and this has a favorable effect on the cost of the panel.

Test Panel 10

An $SF_6$—filled panel was constructed to have the form shown in FIG. 2 and to the same dimensions as Test Panel 8.

The following properties were observed:
Cg = 39% Ca
$R_w$ = 41 dB
$f_R$ = 160Hz
L = 13 dB

EXAMPLE 9

Test Panel 10 was filled with a gaseous medium consisting of 25% $SF_6$ and 75% air.
The following properties were observed:
Cg = 78% Ca
$R_w$ = 42 dB
$f_R$ = 160Hz
L = 21 dB Again it will be noted that the inclusion of a proportion of air in the gaseous medium has a favorable effect on sound transmission loss at the resonance frequency as compared with a panel in which the gaseous medium does not contain air.

FIG. 3

Figure 3:
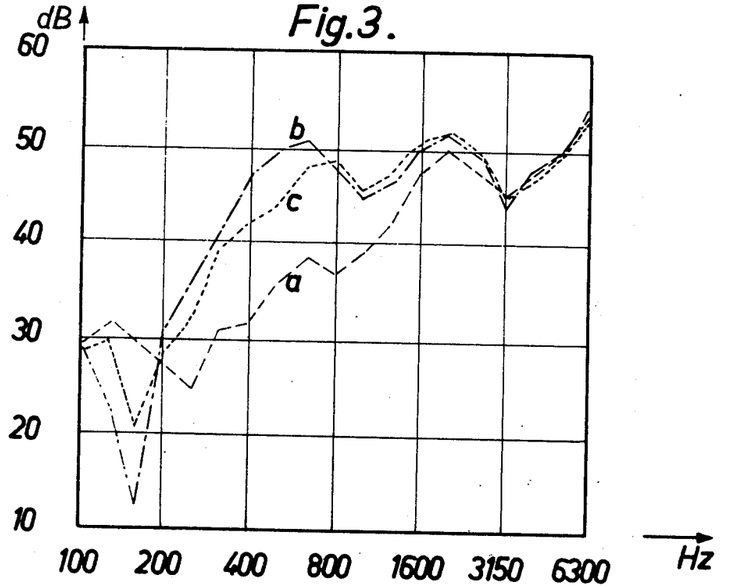
FIG. 3 is a graph of sound transmission loss through double glazing panels plotted against the frequency of incident sound waves.

FIG. 3 is a graph showing the sound transmission loss through three double glazing panels over a range of sound frequencies. Curves a and b show the behavior of Test Panels 8 and 10, respectively, and curve c shows that of the panel of Example 9.

Curve a shows coincidence transmission peaks at 800Hz and 315Hz, corresponding to the critical coincidence frequencies for a 12mm sheet and a 4mm sheet, and a resonance transmission peak between 250Hz and 300Hz. At the resonance transmission peak frequency ($f_R$) there is a sound transmission loss (L) of 25 dB.

Curve b shows the sound transmission loss through a panel of the same dimensions filled with $SF_6$. It will be noted that there is a considerable improvement over the medium range of frequencies, and a lesser but still noticeable improvement between the coincidence frequencies. Above the higher coincidence frequency there is substantially no difference between curves a and b. Curve b shows a resonance transmission peak at a frequency of 160Hz where there is a sound transmission loss of 13 dB. It will be noted however, that filling the inter-pane space of the panel with $SF_6$ has caused the resonance peak to become sharper and that at frequencies below 200Hz there is in fact a drop in the sound transmission loss afforded. This deterioration at low frequencies is balanced by the gain in sound transmission loss over the range of frequencies from 200Hz to the higher critical frequency of coincidence so that there is a net gain in sound transmission loss $R_w$ of 5 dB. Nevertheless, when the panel has to meet certain standards, e.g., according to ISO-R717, such a panel may be unacceptable in certain circumstances, because of the relative increase in sound transmission at the resonance frequency.

Curve c shows the sound transmission loss through a panel of similar dimensions and filled with a gaseous medium consisting of 25% $SF_6$ and 75% air. It will be noted that above the higher critical frequency of coincidence there is substantially no difference between curve c and curves a and b. Between the critical frequencies there is a marginal improvement over curve b, while over the median frequency range curve c shows considerable improvement over curve a. Again it will be noted that the resonance transmission peak has been displaced in a lower frequency (160Hz), but in this case there is a greatly improved sound transmission loss at the resonance peak of 21 dB. The sound transmission loss $R_w$ for the panel of curve c is 42 giving an improvement of 6 dB over the panel of curve a and 1 dB over the panel of curve b.

FIG. 4

Figure 4:
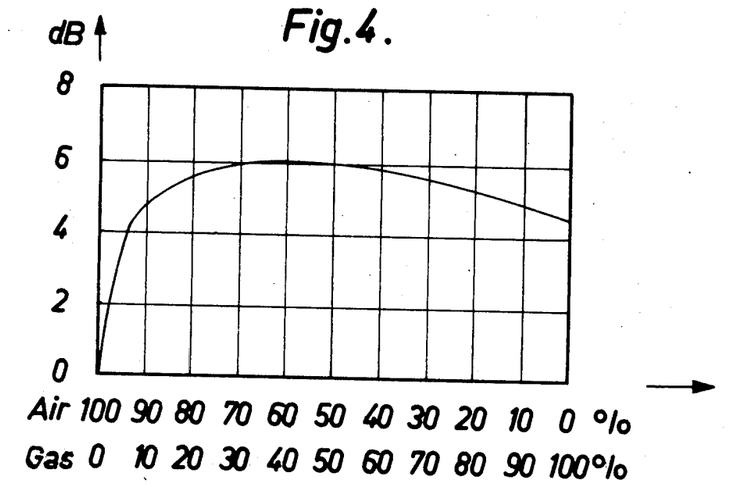
FIG. 4 is a graph showing the variation in sound transmission loss through a double glazing panel whose inter-pane space is filled with a gaseous medium in which the proportion of air is varied.

In order to illustrate the effect of varying the volume proportion of air in the gaseous medium within a double glazing panel, reference will now be made to FIG. 4 which is a graph showing the improvement in sound transmission loss $R_w$ plotted against changing proportions of air in a double glazing panel composed of two panes of glass 12mm and 4mm thick, respectively, and spaced apart by 12mm. The panel is initially air-filled, and the air is progressively replaced by an increasing proportion of $SF_6$. It will be noted that the acoustic improvement afforded increases rapidly until the point at which the gaseous medium consists of 5% $SF_6$ and 95% air, and the curve then flattens out to reach a maximum at approximately 40% $SF_6$ and 60% air. It will also be noted that better results can be achieved with 10;1 % $SF_6$ than with 100% $SF_6$ in the gaseous medium in the inter-pane space of the unit. Finally, it will be noted that the results shown on this graph are applicable to Test Panels 8 and 10 and the panel of Example 9.

It has been found when plotting a similar graph for a panel having glass sheets 12mm apart and 6mm and 4mm thick, respectively, that is with a pane mass ratio of 1.5:1 as opposed to 3:1, the maximum sound transmission loss $R_w$ is afforded when the gas/air mixture in the inter-pane space contains 60% $SF_6$.

FIG. 5

Figure 5:
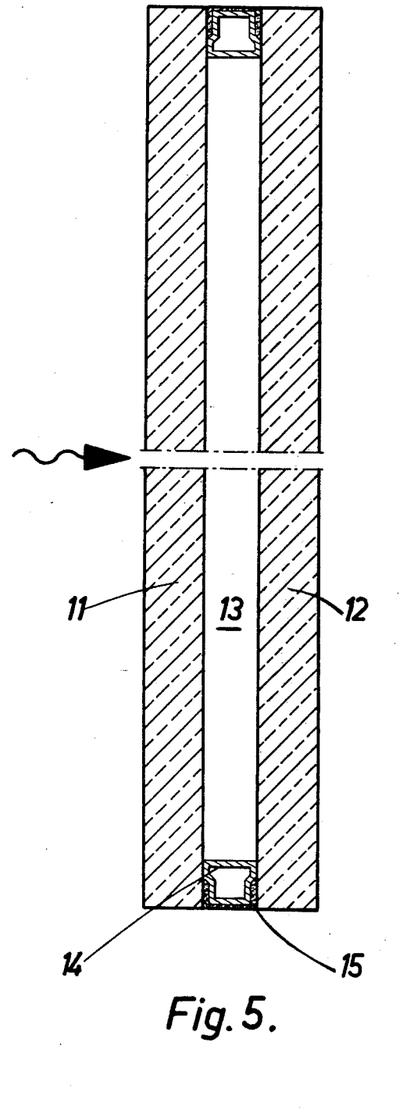
FIGS. 5 and 6 are cross-sectional views of further embodiments of double glazing panels according to the invention.

FIG. 5 shows another type of double glazing unit which includes two panes of glass 11 and 12 with an inter-pane space 13 sealed and maintained by a sheet spacer member 14 glued by an adhesive 15 to the margins of the panes. The spacer member 14 is of box-like construction, and the adhesive used may be of any suitable known type. The glass sheets 11 and 12 are of identical thickness.

Test Panel 11

An air-filled double glazing panel was constructed to have the form shown in FIG. 5. The glass sheets were each 6mm thick and the inter-pane space was 24mm thick. The sound transmission loss was found to be $R_w = I_a = 36$ dB.

Test Panel 12

Test Panel 11 was then filled with $SF_6$, and it was found that $I_a = R_w = 39$ dB.

EXAMPLE 10

Test Panel 11, initially air-filled, was flushed with $SF_6$ so that its inter-pane space contained 63% $SF_6$ and 37% air. For this panel it was found that $I_a = R_w = 40$ dB, which represents an improvement in sound transmission loss of 4 dB over the corresponding air-filled panel, and an improvement of 1 dB over the corresponding $SF_6$ filled panel. This latter improvement is mainly due to the higher sound transmission loss at resonance frequencies.

FIG. 6

Figure 6:
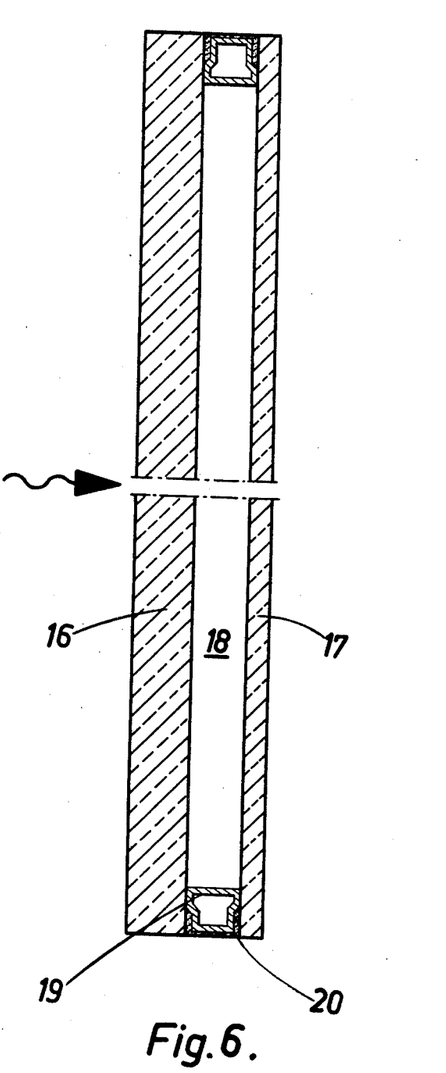

FIG. 6 shows another double glazing unit composed of two panes of glass 16 and 17 with an inter-pane space 18 sealed and maintained by a box-like spacer member 19 glued by an adhesive 20 to the margins of the panes. The first pane 16 is thicker than the second pane 17 and therefore has a greater mass per unit area.

Test Panel 13

An air-filled panel was constructed to have the form shown in FIG. 6. The sheets 16 and 17 were, respectively, 8mm and 5mm thick and the inter-pane space 18 was 12mm thick.
The following properties were observed:
$R_w = 37$ dB p1 $f_R = 250$Hz
$L = 24$ dB

Test Panel 14

The inter-pane space of Test Panel 13 was filled with $SF_6$.
The following properties were observed:
$R_w = 39$ dB
$f_R = 160$Hz
$L = 13$ dB

EXAMPLE 11

The inter-pane space of Test Panel 13 was filled with 25% $SF_6$ and 75% air.
The following properties were observed:
$R_w = 41$ dB
$f_R = 160$Hz
$L = 23$ dB
$K = 2.39$ These properties represent a substantial improvement over Test Panels 13 and 14.

Test Panel 15

The inter-pane space of Test Panel 13 was increased from 12mm to 20mm.

Test Panel 16

The inter-pane space of Test Panel 15 was filled with $SF_6$.
It was found that:
$R_w = 40$ dB
$f_R = {}_{160}$Hz
$L = 13$ dB

EXAMPLE 12

The inter-pane space of Test Panel 15 was filled with a mixture of 25% $SF_6$ and 75% air.
It was found that:
$R_w = 41$ dB
$f_R = 125$Hz
$L = 19$ dB

Test Panel 17

An air-filled panel was constructed to have the form shown in FIG. 6. The glass sheets 16 and 17 were, respectively, 9mm and 5mm thick and the inter-pane space 18 was 20mm thick.

Test Panel 18

Test Panel 17 was filled with a mixture of 90% He and 10% air.
The following properties were observed:
$Cg = 232\% \, Ca$
$R_w = I_a = 46$ dB It was found that the sound transmission loss afforded by this panel was greater than that afforded by air-filled Test Panel 17 even at the range of resonance frequencies, but that the thermal insulation afforded by this panel was very poor.

EXAMPLE 13

Test Panel 17 was filled with a mixture of 40% He and 60% air.
The following properties were observed:
$Cg = 127\% \, Ca$
$R_w = I_a = 43$ dB The sound transmission loss afforded by this panel was improved with respect to the loss afforded by air-filled Test Panel 17 to a very satisfactory level, even though it was not so great as the loss afforded by helium and air-filled Test Panel 18. However the panel of this Example was very much better than Test Panel 18 from the thermal insulation point of view.

From comparison of Test Panel 18 and Example 13 it will be apparent that when using a gas mixture in which the velocity of sound progagation is higher than in air, low volume proportions of air in the mixture give a better sound transmission loss than higher proportions, but at the same time reduce the effectiveness of the panel as a thermal insulator.

Test Panel 19

For comparison purposes an air-filled test panel was constructed to have the form shown in FIG. 6, in which sheet 16 was 12mm thick, sheet 17 was 4mm thick and the inter-pane space 18 was 12mm thick.
The following properties were observed:
$R_w = 38$ dB
$I_a = 39$ dB
$f_R = 250$Hz
$L = 24$ dB
$K = 2.5$

Test Panel 20

Test Panel 19 was filled with $SF_6$, and the following properties were observed:
$R_w = 43$ dB
$f_R = 160$Hz
$L = 14$ dB
$K = 2.46$

EXAMPLE 14

Test Panel 19 was filled with a mixture of 25% $SF_6$ and 75% air, and the following results were observed:
$R_w = 44$ dB
$f_R = 160$Hz
$L = 21$ dB
$K = 2.37$ These figures represent a very satisfactory improvement over Test Panels 19 and 20.

Furthermore, when comparing Example 11 with Example 14 it will be noted that the latter Example gives improved results. This is due at least in part to the greater pane mass ratio of the panel of this latter Example.

Test Panel 21

Test Panel 19 was filled with helium. The following properties were observed:
Cg = 290% Ca
$R_w$ = 46 dB
K = 3.5

It will be seen that this panel gives extremely good results from the acoustic point of view, but at the expense of its thermal insulating properties.

EXAMPLE 15

Test Panel 19 was filled with a mixture of 56% He and 44% air. The following results were observed:
Cg = 145% Ca
$R_w$ = 44 dB
K = 3.0

This represents a very acceptable compromise in that a high sound transmission loss is afforded without as great a decrease in thermal insulating properties as presented by Test Panel 21.

Test Panel 22

Test Panel 19 was filled with methane ($CH_4$), and the following results were observed:
Cg = 129% Ca
$R_w = I_a$ = 40 dB
$f_R$ = 250Hz
L = 25 dB

EXAMPLE 16

In order further to demonstrate the effect of mixing air into the gaseous medium in a panel, Test Panel 19 was filled with a mixture of 50% $CH_4$ and 50% air.
It was found that:
Cg = 113% Ca (calculated)
$R_w = I_a$ = 43 dB
$f_R$ = 160Hz This indicates a noticeable improvement over both an air-filled panel of the same dimensions (Test Panel 19) and the methane-filled Test Panel 22.

EXAMPLE 17

Test Panel 19 was filled with a mixture of 50% $CO_2$ and 50% air. The following properties were observed:
Cg = 88% Ca (calculated)
$R_w = I_a$ = 43 dB
$f_R$ = 160Hz
K = 2.4

This is another very effective sound insulating panel which also has improved thermal insulation properties.

FIG. 7

Further embodiments of the invention will now be described with reference to FIG. 7 which shows a double glazing panel composed of a first pane 21 which is a laminate and consists of two glass sheets 22 and 23 bonded together by means of a layer 24 of polyvinyl butyral (PVB). The glass sheets 22 and 23 are each 6mm thick and the PVB layer 24 is 1.14mm thick and was made up from a number of sheets of commercially available PVB film 0.38mm in thickness. The first pane 21 is separated from a second pane 25 which is 4mm thick by a space 26 which is 12mm thick. The inter-pane space is maintained and sealed by means of a spacer strip 27 soldered at 28 to metallized marginal portions of the two panes.

Test Panel 23

Figures 7, 8:
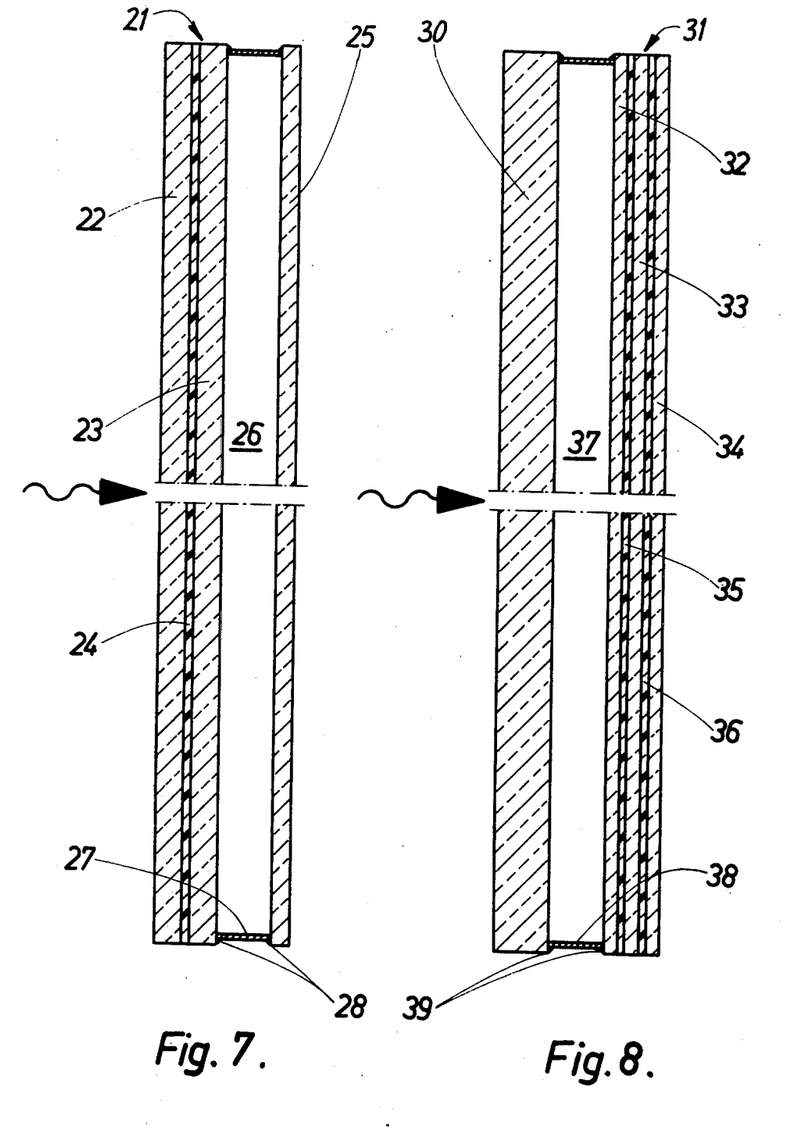
FIG. 7 and 8 are cross-sectional views of further embodiments of double glazing panels according to the invention which incorporate a laminated pane.

An air-filled double glazing panel was constructed to have the form shown in FIG. 7. For this panel, $R_w$ = 39 dB.

Test Panel 24

Test Panel 23 was filled with $CCl_2F_2$. The following results were observed:
$R_w$ = 42 dB
$f_R$ = 160Hz
L = 18 dB

EXAMPLE 18

Test Panel 23 was filled with a mixture of 50% $CCl_2F_2$ and 50% air. The following results were observed:
$R_w$ = 44 dB
$f_R$ = 160Hz
L = 23 dB It will thus be noted that it is also advantageous to mix a proportion of air in the gaseous medium in a panel of this structure.

Test Panel 25

An air-filled double glazing unit was constructed to have the form shown in FIG. 7 except that the inter-pane space was sealed using a glued spacer similar to that described with reference to FIG. 6. The inter-pane space was maintained 12mm thick. $R_w$ was found to be 39 dB.

EXAMPLE 19

Test Panel 25 was filled with a mixture of 40% $SF_6$ and 60% air. $R_w$ was found to be 47 dB, showing this panel affords extremely good sound transmission loss.

FIG. 8

FIG. 8 shows a double glazing panel including a first pane 30 which is a sheet of glass 12mm thick held spaced apart from a second pane 31 constituted by three sheets of glass 32, 33 and 34 each 3mm thick and bonded together using two layers 35 and 36 of PVB each 0.76mm in thickness. The inter-pane space 37 is 12mm thick and is maintained by a spacer strip 38 joined to metallized marginal portions of the two panes by solder beads 39.

EXAMPLE 20

A panel was constructed to have the form shown in FIG. 8, with its inter-pane space filled with a gaseous medium consisting of 25% $CCl_2F_2$ and 75% air.
Cg = 73% Ca
$R_w = I_a$ = 44 dB  $f_R$ = 125Hz
L = 28 dB
L = dB
K = 2.34

Thus it will be seen that this panel gives good results both for thermal and acoustic insulation.

The Examples which follow relate to triple glazing panels.

Figure 9

Figure 9:
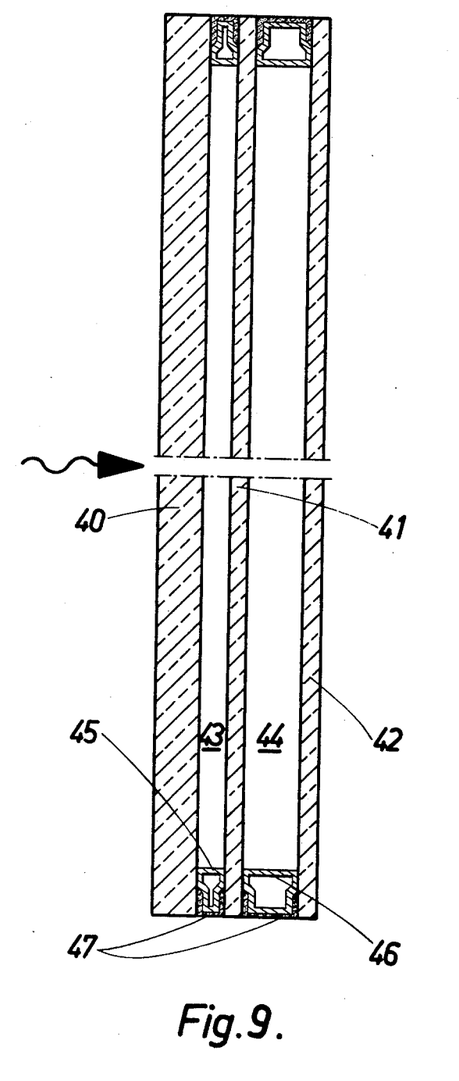
FIGS. 9, 10 and 11 are cross-sectional views of several embodiments of triple glazing panels according to the invention.

FIG. 9 shows a triple glazing unit composed of three glass sheets 40, 41 and 42 having respective thicknesses of 10mm, 4mm and 4mm and spaced apart by inter-pane spaces 43 and 44 having respective thicknesses of 6mm and 12mm. The spaces are sealed from each other and from the atmosphere by box-section spacer member 45 and 46 secured between the sheets by adhesive 47. It will be observed that the mass of the first sheet 40 is 2.5 times that of either of the other sheets 41 and 42 and that one inter-pane space 44 is twice as wide as the other space 43.

Test Panel 26

An air-filled triple glazing panel was constructed to have the form shown in FIG. 9 for comparison purposes. The sound transmission loss through this panel is of the order of 40 dB. When plotting a graph of incident sound frequency against sound transmission loss across the panel it is found that there are two resonance transmission peaks. These occur at $f_R = 200$Hz and $f'_R = 315$Hz.

EXAMPLE 21

The thinner inter-pane space 43 of Test Panel 26 was filled with a mixture of 5% $SF_6$ and 95% air ($C_g$ lower than Ca) and the thicker inter-pane space was filled with 70% helium and 30% air ($C_g$ higher than Ca). For this panel the sound transmission loss was several dB higher than the 40 dB afforded by the corresponding air-filled Test Panel 26. It was found that the lower resonance transmission peak frequency was shifted to a lower frequency value.

FIG. 10

Figure 10:
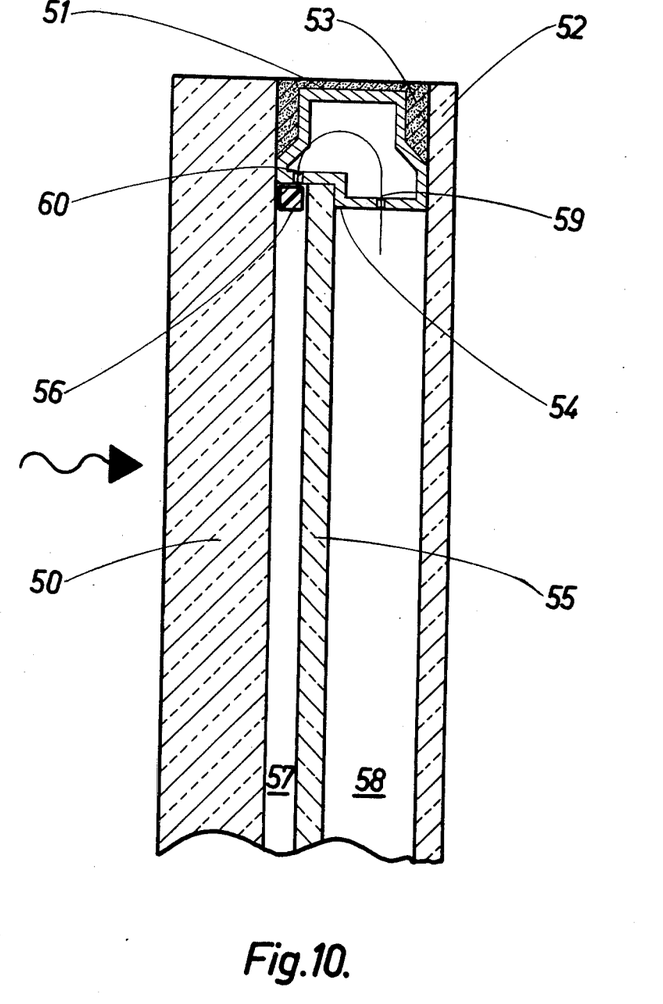

Other triple glazing panels according to the invention can be constructed in the manner shown in FIG. 10. The panel shown includes a first pane 50 constituted by a sheet of glass 10mm thick and this first pane is attached by a box-section spacer member 51 to a second pane of glass 52 which is 4mm thick. The spacer member 51 is secured to the first and second panes by adhesive 53, and is shaped to present a shoulder 54 against which an intermediate pane of glass 55, also 4mm thick, is held by a spacer 56, e.g. of butyl rubber. The inter-pane spaces 57 and 58 between the first and intermediate panes 50 and 55 and between the intermediate and second panes 55 and 52, respectively, are brought into communication by holes 59 and 60 in the spacer member 51. If necessary, an opening can be placed in spacer 56 to assure such communication.

Test Panel 27

An air-filler triple glazing panel was constructed to have the form shown in FIG. 10. The inter-pane spaces 57 and 58 were 2.5mm and 9.5mm thick, respectively. It was found that $R_w = I_a = 39$ dB, when the pane was tested with sound incident upon its thinner exterior pane 52.

EXAMPLE 22

Test Panel 27 was modified in that it was filled with a mixture of 33% $CO_2$ and 67% air. As a result, the sound transmission loss afforded, again when measured with sound incident upon the thinner exterior pane, was increased to $R_w = I_a = 41$ dB. The improvement over Test Panel 27 was particularly noticeable over the resonance frequency range.

Test Panel 28

Test Panel 27 was modified by widening inter-pane space 58 to a thickness greater than 11mm while keeping the same total inter-pane space thickness, i.e. 12mm. This panel was again air-filled, and, when tested with sound incident on the thicker exterior pane as indicated by the arrow in FIG. 10, it was found that $R_w = 41$ dB.

Test Panel 29

Test Panel 28 was filled with $CCl_2F_2$ and it was found that $I_a = 42$ dB and $R_w = 44$ dB.

EXAMPLE 23

Test Panel 28 was modified by filling it with a mixture of 58% $CCl_2F_2$ and 42% air, with the following results:
Cg = 56% Ca
$R_w = 47$ dB
$I_a = 45$ dB
This shows that an increase in sound transmission loss can be afforded by a triple glazing panel filled with a gaseous medium which in part consists of air.

EXAMPLE 24

Test Panel 28 was filled with a mixture of 50% $SF_6$ and 50% air. It was found that $R_W = I_a = 45$ dB.

The use of a pure gas in the inter-pane spaces of a panel having the form shown in FIG. 10 displaces the lower resonance transmission peak to a lower frequency, but at the same time transmission loss at that changing peak frequency is reduced, in comparison with a corrspondingly dimensioned air-filled panel. By mixing such a pure gas with air, however, it is possible to reduce the effects of a resonance transmission peak, and thus improve sound transmission loss over a similarly dimensioned panel filled with either pure air or pure gas.

Test Panel 30

An air-filled triple glazing panel was constructed to have the form shown in FIG. 10 with the modification that the orientation of the spacer member 51 was reversed to hold the intermediate pane 55 closer to the thinner exterior pane 52 than to the thicker pane 50. The thicker inter-pane space between the thicker pane 50 and the intermediate pane 55 was 9.5mm wide and the thinner space was 2.5mm wide. When tested with sound incident on the thicker exterior sheet, as indicated by the arrow in FIG. 10, the sound transmission loss was found to be $R_w = 39$ dB.

Test Panel 31

Test Panel 30 was filled with $SF_6$ and similarly tested. It was found that the sound transmission loss was $R_w = I_a = 41$ dB.

EXAMPLE 25

Test Panel 30 was filled with a mixture of 19% $SF_6$ and 81% air. It was found that $R_w = I_a = 42$ dB.

EXAMPLE 26

The panel of Example 25 was modified by increasing the thickness of the thicker inter-pane space to over 11mm while decreasing the thickness of the thinner inter-pane space so that the total inter-pane space thickness remained the same at 12mm. An improvement in $R_w$ of approximately 1 dB was afforded.

EXAMPLE 27

Figure 11:
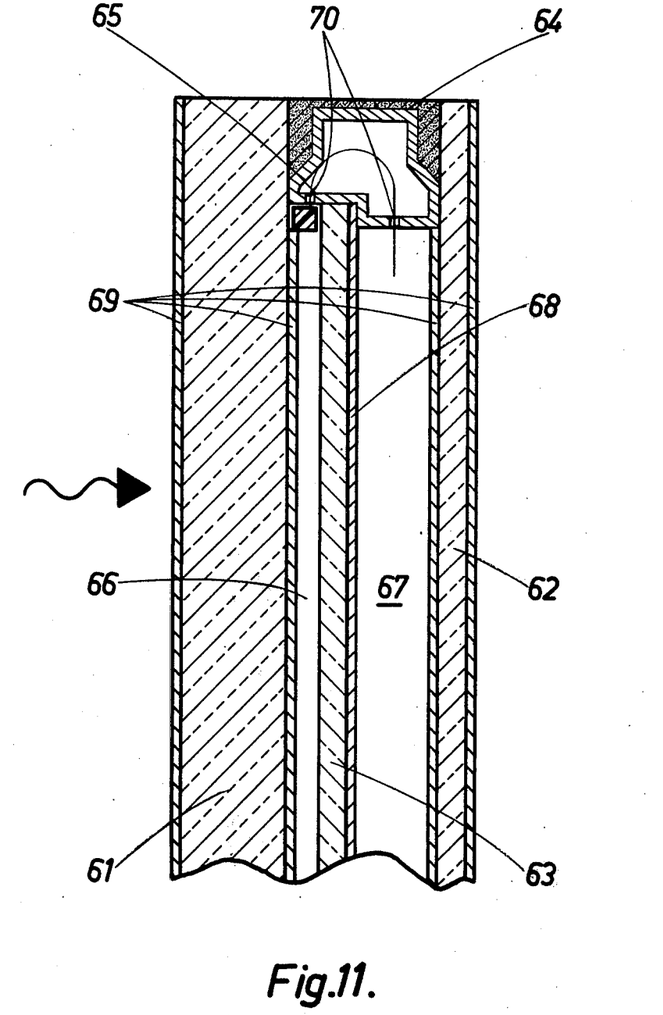

A panel according to the invention which gives particularly good results as regards both its acoustic and its thermal properties may be constructed as shown in FIG. 11. In this embodiment, three sheets of glass 61, 62 and 63 are held in spaced relation by a box-section spacer member 64 glued to the sheets 61 and 62. The spacer member 64 is shaped with a recess 65 having a shoulder against which the intermediate sheet 63 is held, as described with reference to FIG. 9. A thin inter-pane space 66 between the sheets 61 and 63 is in communication with a thicker inter-pane space 67 via holes 70 in the spacer member 64. The intermediate sheet 63 carries, on its face bounding inter-pane space 67, a coating 68 which is adapted to reflect infrared radiation. Such coating could for example be of copper, gold or tin oxide. Each face of the other sheets 61 and 62 bears a coating 69 which is adapted to cut down visible light reflection. These coatings 69 could for example be of titanium oxide or silicon dioxide, and they have the effect of increasing light transmission, and of avoiding double images when viewing through the panel. Of course other combinations of coatings are also possible, as are other coating materials.

A panel constructed to have the form shown in FIG. 11 may be filled with any suitable gaseous medium, for example a gaseous medium as specified in any one of Examples 22 to 26. If a gaseous medium as specified in one of those other Examples is used, and the panel of the present Example is constructed to the same dimensions as the respective other Example, it will be found that the sound transmission loss afforded by the panel according to FIG. 11 is very similar.

In a variant, both faces of the intermediate sheet 63 are covered with an infrared reflecting coating. In another variant, one of the anti-reflection coatings 69 is replaced by an infrared reflecting coating. In a further variant, the two inter-pane spaces 66 and 67 are isolated from one another. In this variant the two inter-pane spaces can be filled with respectively different gaseous media. For example a medium in which Cg is less than Ca could be introduced into the narrow inter-pane space to confer good thermal properties on the panel while a medium in which Cg is greater than Ca could be introduced into the wider inter-pane space to give good sound transmission loss.

In particular, the inter-pane spaces could be filled with the respective gaseous media specified in Example 21, and for a similarly dimensioned panel, similar sound transmission loss will be afforded.

It will be appreciated that any of the Examples presented herein can be modified, for example by using a different gaseous medium, expecially a gaseous medium as set forth in one of the other Examples, and that any of the panels described with reference to FIGS. 1, 2, 5, 6, 7, 8, 9 and 10 can be given one or more sheet face coatings e.g. a coating as described in Example 27.

Furthermore, it will be appreciated that a desiccant can be introduced into the or each inter-pane space of a panel described in any of the Examples. This can very conveniently be done by using a box-section spacer member as described with reference to any of FIGS. 5, 6, 9, 10 and 11, in which one or more holes or a groove is or are formed in the spacer member so that its interior communicates with its associated inter-pane space. The desiccant can then be contained within the spacer member.

It will also be appreciated that the interior face of a spacer member can be covered with a sound deadening material such as felt. This can have a particularly beneficial effect on the resonance transmission peak, especially when the gaseous medium used is one in which the velocity of the sound propagation is lower than air.

It will be understood that the above description of the present invention is susceptible to various modifications, changes and adaptations, and the same are intended to be comprehended within the meaning and range of equivalents of the appended claims.

What is claimed is:

1. In a light transmitting panel composed of at least two panes, and spacer means holding the panes in spaced relation to define at least one inter-pane space therebetween, the improvement wherein, for improving the sound damping properties of said panel, said inter-pane space is more than 9mm thick and is sealed from the atmosphere, and said panel further comprises a gaseous medium at least 30% by volume of which has the composition of air, the medium further including a quantity of at least one other gas, and the composition of said medium being such that the velocity of sound propagation in said gaseous medium at a given temperature and pressure differs from that in dry air at the same pressure and temperature by a least 5%.

2. A panel as defined in claim 1 wherein at least 50% by volume of the medium has the composition of air.

3. A panel as defined in claim 2 wherein the composition of said medium is such that the velocity of sound propagation therein is between 40 and 95% of that in dry air at the same pressure and temperature.

4. A panel as defined in claim 1 wherein the composition of said medium is such that the velocity of sound propagation therein is between 40 and 95% of that in dry air at the same pressure and temperature.

5. A panel as defined in claim 4 wherein the composition of said medium is such that the velocity of sound propagation therein is at least 60% of that in dry air at the same pressure and temperature.

6. A panel as defined in claim 4 wherein said one other gas is sulphur hexafluoride ($SF_6$).

7. A panel as defined in claim 4 wherein said one other gas is selected from the group consisting of dichlorodifluoromethane ($CCl_2F_2$), carbon dioxide ($CO_2$), argon (Ar), butane ($C_4H_{10}$), nitrous oxide ($N_2O$), and chloropentafluoroethane ($C_2ClF_5$).

8. A panel as defined in claim 1 wherein the mass per unit area of one of said panes is at least 1.2 times as great as the mass per unit area of another one of said panes.

9. A panel as defined in claim 8 wherein the mass per unit area of said one of said panes is at least 1.2 times as great as the mass per unit area of each other one of said panes.

10. A panel as defined in claim 1 wherein two of said panes have two respectively different masses per unit area and the heavier of said two panes has a mass per unit area at most equal to three times the mass per unit area of the lighter of said two panes.

11. A panel as defined in claim 1 wherein said other gas is selected from the group consisting of helium (He), neon (Ne), methane ($CH_4$), and hydrogen ($H_2$).

12. A panel as defined in claim 11 wherein at least 50% by volume of the medium has the composition of air.

13. A panel as defined in claim 11 wherein the composition of said medium is such that the velocity of sound propagation therein is at least 1.20 times that in dry air at the same pressure and temperature.

14. A panel as defined in claim 11 wherein the mass per unit area of at least one of said panes is at least 1.2 times as great as the mass per unit area of another one of said panes.

15. A panel as defined in claim 14 wherein the composition of said medium is such that the velocity of sound propagation therein is at least 1.20 times that in dry air at the same pressure and temperature.

16. A panel as defined in claim 14 wherein the mass per unit area of said at least one pane is at least 1.2 times as great as the mass per unit area of each other one of said panes.

17. A panel as defined in claim 14 wherein the mass per unit area of said one pane is at most equal to three times the mass per unit area of another one of said panes.

18. A panel as defined in claim 1 wherein there are three of said panes held by said spacer means to define two sealed inter-pane spaces, and said spaces are filled with respectively different gaseous media in which the velocities of sound propagation differ from each other.

19. A panel as defined in claim 18 wherein the gaseous medium in one of said spaces has a composition such that the velocity of sound propagation is lower than in dry air at a given pressure and temperature and the gaseous medium in the other of said spaces has a composition such that the velocity of sound propagation is higher than in dry air at the given pressure and temperature.

20. A panel as defined in claim 1 wherein there are three of said panes held by said spacer means to define two inter-pane spaces of respectively different thicknesses.

21. A panel as defined in claim 20 wherein said spaces are filled with respectively different gaseous media, with the composition of the gaseous medium in the thinner of said spaces being such that the velocity of sound propagation therein is lower than in dry air at the given pressure and temperature and the composition of the gaseous medium in the thicker of said spaces being such that the velocity of sound propagation therein is higher than in dry air at the given pressure and temperature.

22. A panel as defined in claim 21 wherein the thicker of said inter-pane spaces is at least twice as thick as the thinner of said spaces.

23. A panel as defined in claim 20 wherein the thicker of said inter-pane spaces is at least twice as thick as the thinner of said spaces.

24. A panel as defined in claim 1 wherein at least one of said panes is a laminate.

25. A panel as defined in claim 1 further comprising a metal or oxide coating on at least one said pane, on the surface thereof bounding one said inter-pane space.

26. A panel as defined in claim 1 further comprising a desiccant in communication with said space, said desiccant comprising a material selected from the group consisting of calcium sulphate ($CaSO_4$); calcium chloride ($CaCl_2$); calcium hydride ($CaH_2$); diphosphorus pentoxide ($P_2O_5$), and a molecular sieve with pores smaller than or equal to 4 A.

27. In a method of manufacturing a light-transmitting panel composed of at least two panes and spacer means holding the panes in spaced relation to define at least one inter-pane space, the improvement wherein, for improving the sound damping properties of said panel, said method comprises the steps of: bringing at least two such panes into face-to-face relation with a spacing therebetween of at least 9mm, whereby the spacing between the panes constitutes such inter-pane space; fastening such panes to the spacer means in a manner to maintain such spacing; and filling the resulting inter-pane space with a gaseous medium comprising air, constituting at least 30% by volume of the medium, and an additional amount of at least one other gas selected to give the medium a composition such that the velocity of sound propagation in the medium, at a given temperature and pressure, differs from the velocity of sound propagation in dry air at the same pressure and temperature by at least 5%.

28. A method as defined in claim 27 wherein the gaseous medium comprises at least 50% by volume of dry air.

29. A method as defined in claim 27 wherein the at least one other gas is selected so as to cause the velocity of sound propagation in the gaseous medium to be between 40% and 95% of that in dry air at the same pressure and temperature.

30. A method as defined in claim 29 wherein the gaseous medium comprises at least 50% by volume of dry air.

31. A method as defined in claim 27 wherein the two panes have respectively different masses per unit area.

32. A method as defined in claim 31 wherein the gaseous medium comprises at least 50% by volume of dry air.

33. A method as defined in claim 31 wherein the at least one other gas is selected so as to cause the velocity of sound propagation in the gaseous medium to be between 40% and 95% of that in dry air at the same pressure and temperature.

34. A method as defined in claim 27 wherein the at least one other gas is sulphur hexafluoride ($SF_6$).

35. A method as defined in claim 34 wherein the gaseous medium comprises at least 50% by volume of dry air.

36. A method as defined in claim 34 wherein the at least one other gas is selected so as to cause the velocity of sound propagation in the gaseous medium to be between 40% and 95% of that in dry air at the same pressure and temperature.

37. A method as defined in claim 34 wherein the two panes have respectively different masses per unit area.

38. A method as defined in claim 27 further comprising bringing the inter-pane space into communication with a desiccant which is selected from the group consisting of calcium sulphate ($CaSO_4$); calcium chloride ($CaCl_2$); calcium hydride ($CaH_2$); diphosphorus pentoxide ($P_2O_5$), and a molecular sieve with pores smaller than or equal to 4 A.

* * * * *